United States Patent [19]

Battaglia

[11] Patent Number: 4,806,583

[45] Date of Patent: Feb. 21, 1989

[54] ANTIGLARE COATING

[76] Inventor: Charles R. Battaglia, 725 NE. 7th St., Pompano Beach, Fla. 33060

[21] Appl. No.: 64,165

[22] Filed: Jun. 19, 1987

[51] Int. Cl.[4] ................................ C08K 5/10
[52] U.S. Cl. .................... 524/315; 524/507; 524/903; 427/64
[58] Field of Search .............. 524/903, 315, 507; 427/64, 108, 110

[56] References Cited

U.S. PATENT DOCUMENTS

| | | | |
|---|---|---|---|
| 2,442,976 | 6/1948 | Heany | 427/110 |
| 3,679,451 | 7/1972 | Marks et al. | 427/64 |
| 3,689,312 | 9/1972 | Long | 427/64 |
| 4,187,204 | 2/1980 | Howard | 524/315 |
| 4,240,940 | 12/1980 | Vasishth et al. | 524/903 |
| 4,265,797 | 5/1981 | Suk | 524/903 |
| 4,544,578 | 10/1985 | Duane | 427/140 |
| 4,582,761 | 4/1986 | Liu | 427/64 |

FOREIGN PATENT DOCUMENTS

| | | | |
|---|---|---|---|
| 1155579 | 10/1983 | Canada | 524/903 |
| 57-59960 | 4/1982 | Japan | 524/903 |

*Primary Examiner*—Lewis T. Jacobs
*Attorney, Agent, or Firm*—Bailey & Hardaway

[57] ABSTRACT

A spray on coating composition for reducing the glare and reflective characteristics of the surface of a cathode ray tube comprising a carrier consisting of polyurethane lacquer and a flatting agent such as silica, an anti-foaming agent to reduce the effects of bubbles on the sprayed on coating, a setting agent to quicken the hardening process of the sprayed on coating to reduce the effect of gravity on the uniformity in thickness of the coating. The coating composition sharply reduces the glare and reflection characteristics caused both by emission from within the CRT and by ambient light incident thereupon without substantial reduction in clarity and light intensity of the characters displayed on the screen. The particles comprising the coating are preferably in the range of from submicron size to 24 microns. In one embodiment herein, from $\frac{1}{2}$% to 20% of the mass of the coating consists of a silica type flatting agent.

3 Claims, No Drawings

ANTIGLARE COATING

BACKGROUND OF THE INVENTION

1. Field of the Invention

This invention is related to coating compositions and more specifically to a spray on formula for reducing the glare and relection characteristics of the typical cathode ray tube (CRT) screen which only minimally effects the light intensity and clarity of the image viewed therethrough.

2. Prior Art

The need has arisen for a coating composition for a CRT tube which has anti-reflective properties but which does not simultaneously reduce the clarity or light intensity passing through the screen beyond an acceptable level and which also allows "leaking" or dispersion of accumulated excess electrostatic energy therethrough. Those who work in front of cathode ray tube screens common to most of today's personal computers, as well as television screens, are acutely aware of the effect on viewing brought about by reflection of ambient light and by glare emanating from within the CRT itself. The glare and reflection visited upon the viewer is a result of the reflective nature of the glass CRT screen.

It is common for the CRT user simply to turn down the intensity level of the display to reduce glare, which unfortunately has an adverse effect on the visibility of the characters with a consequent increase in reading effort. This increased reading effort has been shown to lead to eye strain, headaches and fatigue. In the past, efforts have been directed to reduce the glare and reflection by placing anti-reflective films over the screen which are expensive to manufacture and ship and are especially cumbersome to apply, e.g., by cementing with adhesives or by heat sealing or press welding. Of particular interest is U.S. Pat. No. 3,356,523 to Libbert which discloses a polystyrene film containing an anti-reflection coating.

Further attempts at reducing the glare and reflection above mentioned are embodied in mechanical screens or filters as an attachment to the CRT as disclosed in U.S. Pat. No. 4,427,264 to Kamerling and in U.S. Pat. No. 4,577,928 to Brown. Inherent in mechanical screen apparatus is the limited viewing angle allowed as a result of the physical dimensions of the add on screen.

Also of nominal interest are the following U.S Patents:

| | |
|---|---|
| Niwa | 3,698,761 |
| Binghan | 3,527,729 |
| Horvath | 4,413,084 |
| Blake, Jr. | 4,507,426 |
| Barsotti | 4,614,683 |

It has not heretofore been proposed to provide a spray on single layer anti-reflection coating for the surface of a CRT screen which difuses ambient light and allows accumulated excess electrostatic energy to be dissipated therethrough while causing no more than 5% loss in light intensity and clarity.

SUMMARY OF THE INVENTION

The instant invention discloses a spray on anti-reflective coating composition suitable for application to CRT screens, as for example personal computer terminals as well as television screens, comprised of a lacquer carrier, silica, a setting agent, an anti-foaming agent and a suitable propellant for application from a storage medium to a screen.

One object of the present invention is to provide a spray on film with an efficient anti-reflection coating.

A further object of the invention is to provide a transparent spray on anti-glare and anti-reflective coating which results in minimal loss in light intensity and clarity of the viewed image through a CRT screen.

A still further object of the present invention is to provide an anti-glare, anti-reflection CRT screen coating which allows accumulated excess electrostatic energy to the dispersed therethrough to allow the CRT to function properly.

A still further object is to provide a spray on anti-reflection coating composition for CRT screens which is abrasion resistent.

Other objects and advantages will be apparent hereinafter.

DETAILED DESCRIPTION OF THE PREFERRED EMBODIMENT

The anti-glare, anti-reflection, spray on coating of the instant invention is designed to eliminate the problem strongly felt by viewers of all types of cathode ray tubes, particularly computer CRT terminals, by sharply reducing the glare and reflection characteristics thereof while only minimally affecting the clarity and light intensity of the displayed characters. The disclosed coating combination is preferably comprised of the combination of a laquer, a flatting agent, an anti-foaming agent, a setting agent, and a propellant to transport the composition from its container to the surface of the CRT screen.

The range of weight of the respective components are preferably as follows:

| COMPONENT | RANGE (% BY WEIGHT) |
|---|---|
| Lacquer | 30%–75% |
| Propellant | 10%–50% |
| Silica | .01%–7% |
| Anti-foaming agent | .01%–4% |
| Setting agent | .01%–3% |

The lacquer may be an amorphous polyurethane mass. The propellant may be selected from the group of which butyl acetate is a member. The flatting agent is preferably silica. The anti-foaming agent is preferably a flow control agent that also functions as a defoamer. The setting agent is preferably a thermoplastic interpolymer of styrene and acrylate monomers having a high resistance to ultraviolet light degradation. The setting agent is preferably selected from the family of thermoplastic, solvent soluble copolymers of styrene with butadiene or various acrylic monomers. The selection of setting agent is important inasmuch as application of a spray on composition will result in the unequal thickness distribution across the screen due to the effects of gravity unless the composition sets up and hardens quite rapidly. This is true whether the screen is disposed horizontally or otherwise when the composition is applied because most CRT screens are curved and the applied composition will tend to run off due to gravity until hardening occurs.

EXAMPLE 1

The coating composition of the instant disclosure, in the preferred embodiment, is comprised of 61.9% polyurethane lacquer, 34.6% propellant (butyl acetate), 1.2% silica (Syloid 244, registered trademark of Davison Chemical, a Division of Grace Corporation), 2% anti-foaming agent (Troy AFL, trademark of Troy Chemical Corporation, Newark, N.J. and .3% setting agent (Pliolite 80, trademark of Goodyear Tire and Rubber Company).

EXAMPLE 2

As a second example, the anti-glare composition of the instant invention may be comprised of one ounce Xylene solvent mixed with and dissolved with one gram Pliolite 80, which is also mixed with three ounces of butyl acetate, used as a propellant, together with three grams of Syloid 224 and one gram Syloid 83, carried by approximately 200 milliliters of polyurethane clear lacquer carrier and 3% anti-foaming and 1% anti-setting agents respectively. The anti-foaming agent is preferably Troysol Q148 of the Troy Chemical Corporation and the setting agent is preferably Pliolite 80, made by Goodyear Tire and Rubber Company.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A coating composition for reducing the glare and reflective properties associated with a cathode ray tube (CRT) screen, comprising:
   - 30% to 75% by weight lacquer;
   - 10% to 50% by weight propellant;
   - 0.01% to 7% flatting agent;
   - 0.01% to 4% anti-foaming agent; and
   - 0.01% to 3% by weight of a polymeric, thermoplastic hardening component which provides equal coating thickness distribution across the CRT screen.

2. The coating composition of claim 1 in which the lacquer is a polyurethane lacquer, the propellant is butyl acetate, the flatting agent is silica and the setting agent is a thermoplastic copolymeric of styrene and butadiene.

3. The coating composition of claim 2 wherein:
   - the polyurethane lacquer makes up 61.9% of the composition;
   - the butyl acetate makes up 34.6% of the composition;
   - the silica makes up 1.2% of the solution;
   - the anti-foaming agent makes up 2% of the composition; and
   - the hardening component makes up 0.3% of the composition.

* * * * *